United States Patent
Sodagar

(10) Patent No.: US 12,184,495 B2
(45) Date of Patent: Dec. 31, 2024

(54) METHOD AND APPARATUS FOR PROVISIONING OF NEW EDGE SERVERS IN 5G NETWORKS USING TRIGGERING EVENTS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/060,880

(22) Filed: Dec. 1, 2022

(65) Prior Publication Data

US 2023/0254211 A1     Aug. 10, 2023

Related U.S. Application Data

(60) Provisional application No. 63/307,553, filed on Feb. 7, 2022.

(51) Int. Cl.
*H04L 12/70* (2013.01)
*H04L 41/08* (2022.01)

(52) U.S. Cl.
CPC ................. *H04L 41/0886* (2013.01)

(58) Field of Classification Search
CPC .................................................. H04L 41/0886
USPC .......................................................... 709/223
See application file for complete search history.

(56) References Cited

U.S. PATENT DOCUMENTS

| | | | |
|---|---|---|---|
| 10,866,836 B1* | 12/2020 | Guo | G06F 9/5027 |
| 2013/0141224 A1 | 6/2013 | Traub et al. | |
| 2020/0178198 A1 | 6/2020 | Ding et al. | |
| 2021/0007166 A1* | 1/2021 | Liao | H04W 48/16 |
| 2021/0136177 A1* | 5/2021 | Hall | H04L 67/289 |
| 2021/0201652 A1* | 7/2021 | Mondal | H04N 7/181 |
| 2021/0314391 A1* | 10/2021 | Lee | H04W 72/56 |
| 2021/0320955 A1* | 10/2021 | Kolan | H04L 65/765 |

(Continued)

FOREIGN PATENT DOCUMENTS

| | | |
|---|---|---|
| WO | 2020/231116 A1 | 11/2020 |
| WO | 2021/138309 A1 | 7/2021 |
| WO | 2021/187913 A1 | 9/2021 |

OTHER PUBLICATIONS

International Search Report dated Apr. 11, 2023 issued in International Application No. PCT/US2022/052639.

(Continued)

*Primary Examiner* — Ario Etienne
*Assistant Examiner* — Elizabeth Kassa
(74) *Attorney, Agent, or Firm* — Sughrue Mion, PLLC

(57) ABSTRACT

A method performed by at least one processor in a network node includes subscribing to one or more events defined for a first edge server, each subscribed event being associated with one or more triggering conditions. The method includes, responsive to determining by the first edge server that at least one triggering condition is satisfied, generating a respective subscribed event. The method includes receiving an event notification corresponding to the generated event. The method includes determining whether the event associated with the received event notification meets an edge server activation condition. The method includes activating a second edge server based on a determination that the event meets the edge server activation condition.

12 Claims, 5 Drawing Sheets

(56) References Cited

U.S. PATENT DOCUMENTS

| | | | |
|---|---|---|---|
| 2021/0352156 A1* | 11/2021 | Kim | H04L 47/286 |
| 2022/0038554 A1 | 2/2022 | Merwaday et al. | |
| 2022/0345978 A1* | 10/2022 | Shimizu | H04W 40/12 |
| 2022/0408423 A1* | 12/2022 | Ljung | H04W 72/20 |
| 2023/0018191 A1* | 1/2023 | Moustafa | H04L 67/1095 |
| 2023/0026671 A1* | 1/2023 | Seed | H04W 36/32 |
| 2023/0060164 A1* | 3/2023 | Wang | H04W 36/08 |
| 2023/0239343 A1* | 7/2023 | Ge | H04L 67/1031 709/203 |
| 2023/0292226 A1* | 9/2023 | Bouazizi | H04W 48/16 |

OTHER PUBLICATIONS

Written Opinion dated Apr. 11, 2023 issued in International Application No. PCT/US2022/052639.

3GPP TS 23.558 V17.2.0 (Dec. 2021), 3rd Generation Partnership Project; Technical Specification Group Services and System Aspects; Architecture for enabling Edge Applications; (Release 17), 5G, 3GPP, A Global Initiative, pp. 1-163.

3GPP TS 26.501V16.8.0 (Jun. 2021), 3rd Generation Partnership Project; Technical Specification Group Services and System Aspects; 5G Media Streaming (5GMS); General description and architecture (Release 16), 5G, 3GPP, A Global Initiative, pp. 1-79.

3 GPP TS 29.558V1.3.0 (Jan. 2022), 3rd Generation Partnership Project; Technical Specification Group Core Network and Terminals; Enabling Edge Applications; Application Programming Interface (API) specification; Stage 3; (Release 17), 5G, EGPP, A Global Initiative, pp. 1-190.

* cited by examiner

METHOD AND APPARATUS FOR PROVISIONING OF NEW EDGE SERVERS IN 5G NETWORKS USING TRIGGERING EVENTS

CROSS-REFERENCE TO RELATED APPLICATION

This application claims priority from U.S. Provisional Application No. 63/307,553, filed on Feb. 7, 2022, in the United States Patent and Trademark Office, the disclosure of which is incorporated herein by reference in its entirety.

FIELD

The disclosure generally relates to 5th generation (5G) media streaming (5GMS), and, provisioning of new edge servers in 5g networks using triggering events.

BACKGROUND

The fifth-generation (5G) standard for broadband networks allows for applications to be run on edge networks, enabling high bandwidth, low latency, and distributed processing.

The 3rd Generation Partnership Project (3GPP) TS23.558 (3rd Generation Partnership Project; Technical Specification Group Services and System Aspects; Architecture for enabling Edge Applications (Release 17), V2.0.0) defines the general architecture for enabling edge application, including the discovery of hardware capabilities of an edge element. 3GPP TSO 26.501 (3GPP TSO 26.501, 3rd Generation Partnership Project; Technical Specification Group Services and System Aspects; 5G Media Streaming (5GMS); General description and architecture (Release 16), V16.3.1) defines the general architecture for 5G media streaming applications and TS26.512 defines the application programming interface (API) calls for that architecture. 3GPP TRY 26.803 (3rd Generation Partnership Project; Technical Specification Group Services and System Aspects; Study on 5G Media Streaming Extensions for Edge Processing (Release 17) V1.5.1) also relates to 5th generation media streaming (5GMS) and edge processing.

The 5GMS architecture recently provided an extension to use edge servers in the architecture. However, the detailed methods of provisioning these edge servers are not defined yet. 3GPP TS23.558 defines the general architecture for enabling edge applications, including the discovery of hardware capabilities of an edge element.

The current 5G Edge architecture defined in 3GPP TS23.558 only defines the discovery of the edge application by application clients. The 3GPP TS26.501 only defines the media streaming architecture. The 3GPP TS26.501 recently added the use of the TS23.558 edge architecture as part of the 5GMSA architecture as an extension. However, the actual method of provisioning such services is not defined.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

According to an exemplary embodiment, a method performed by at least one processor in a network node includes subscribing to one or more events defined for a first edge server, each subscribed event being associated with one or more triggering conditions. The method further includes, responsive to determining by the first edge server that at least one triggering condition is satisfied, generating a respective subscribed event. The method further includes receiving an event notification corresponding to the generated event. The method further includes determining whether the event associated with the received event notification meets an edge server activation condition. The method further includes activating a second edge server based on a determination that the event meets the edge server activation condition.

According to an exemplary embodiment, a network node includes at least one memory configured to store program code and at least one processor configured to read the program code and operate as instructed by the program code. The program code includes subscribing code configured to cause the at least one processor to subscribe to one or more events defined for a first edge server, each subscribed event being associated with one or more triggering conditions. The program code includes generating code configured to cause the at least one processor to, responsive to determining by the first edge server that at least one triggering condition is satisfied, generate a respective subscribed event. The program code include receiving code configured to cause the at least one processor to receive an event notification corresponding to the generated event. The program code includes determining code configured to cause the at least one processor to determine whether the event associated with the received event notification meets an edge server activation condition. The program code includes activating code configured to cause the at least one processor to activate a second edge server based on a determination that the event meets the edge server activation condition.

According to an exemplary embodiment, a non-transitory computer readable medium having instructions stored therein, which when executed by a processor in a network node cause the processor to execute a method including subscribing to one or more events defined for a first edge server, each subscribed event being associated with one or more triggering conditions. The method further includes, responsive to determining by the first edge server that at least one triggering condition is satisfied, generating a respective subscribed event. The method further includes receiving an event notification corresponding to the generated event. The method further includes determining whether the event associated with the received event notification meets an edge server activation condition. The method further includes activating a second edge server based on a determination that the event meets the edge server activation condition.

Additional embodiments will be set forth in the description that follows and, in part, will be apparent from the description, and/or may be learned by practice of the presented embodiments of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
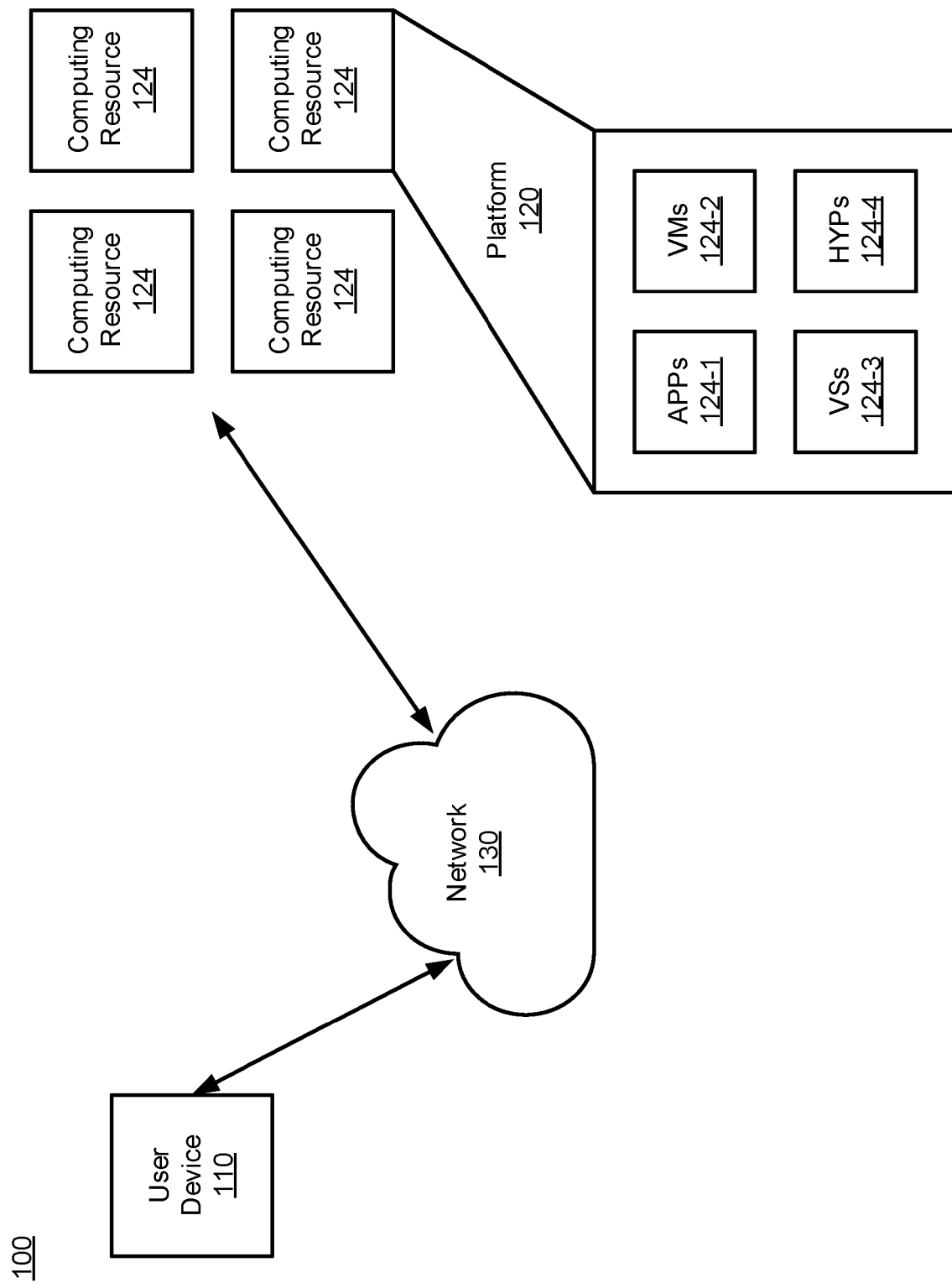
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure define a provisioning method of new edge servers based on the triggering events of a running edge servers by a 5G device. The embodiments of the present disclosure provide the significantly advantageous features of enabling a 5G device to request the network to start one or more new edge servers when the existing edge servers reach certain limitation (e.g., a running edge server is congested).

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
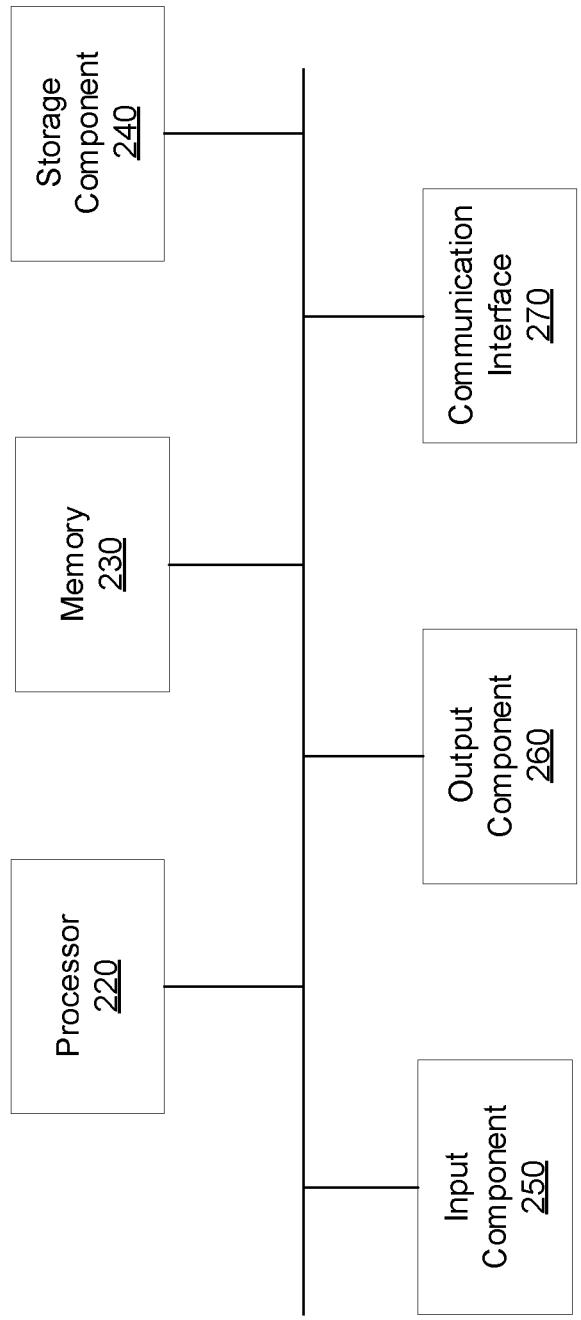
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
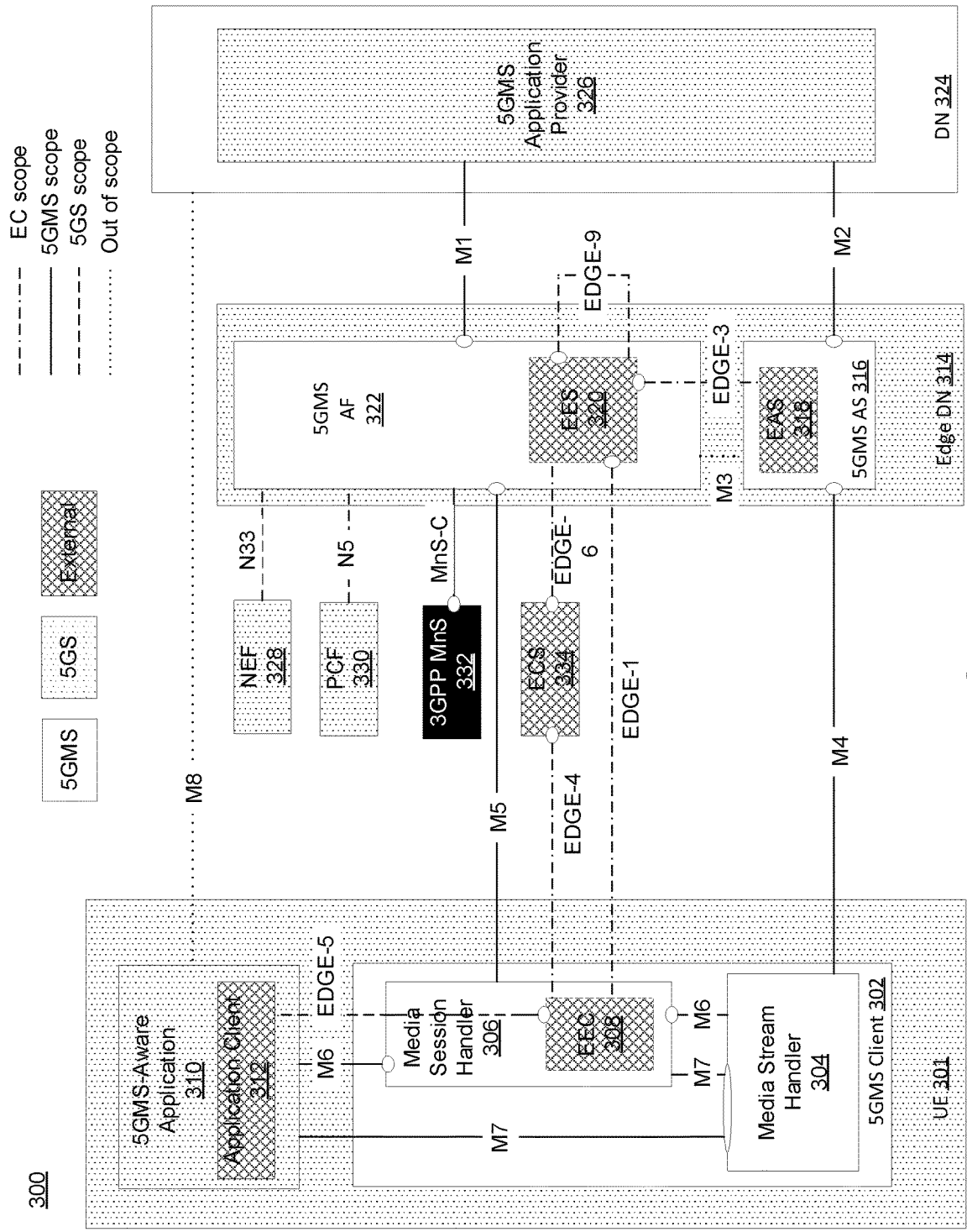
FIG. 3 is a diagram of a 5th generation (5G) media streaming network architecture, according to embodiments.

FIG. 3 illustrates an embodiment of a 5GMS architecture 300 with edge extensions. The architecture 300 includes a UE 301, an edge data network (DN) 314, and a DN 324. The UE 301 may include a 5GMS client. The 5GMS client 302 may include a media stream handler 304 and a media session handler (MSH) 306. The MSH 306 may include an edge enabler client (EEC) 308. The UE 301 may further includes a 5GMS-Aware Application 310 that includes an application client 312.

The edge DN 314 may include a 5GMS application server (AS) 316. The 5GMS AS 316 may include an edge application server (EAS) 318. The edge DN 314 may further include a 5GMS application function 322 that may include edge enabler server (EES) 320.

The DN 324 may include a 5GMS Application Provider 326. The architecture 300 may further include a network exposure function (NEF) 328, a policy and charging function (PCF) 330, 3GPP management services (MnS) 332, and edge configuration server 334. As illustrated in FIG. 3, the components communicate over various interfaces. The interfaces may include EC scope interfaces such as EDGE-1, EDGE-3, EDGE-4, EDGE-5, EDGE-6, and EDGE-9. The interfaces further includes 5GMS scope interfaces such as M1, M2, M4, M5, M6, and M7 interfaces. The architecture 300 may further includes 5GS scope interfaces such as N5 and N33. The architecture 300 may further include out of scope interfaces such as M3 and M8.

In some embodiments, the Application Provider may provision a new EAS using the M1 interface. Using this interface, the Application Provider may create, update, or retrieve the edge resource configuration using a data model such as the model illustrated in Table 1.

TABLE 1

| Property name | Type | Cardinality | Description |
| --- | --- | --- | --- |
| edgeResourcesConfigurationId | ResourceId | 1 . . . 1 | An identifier for this Metrics Reporting Configuration that is unique within the scope of the enclosing Provisioning Session. |
| edgeManagementMode | EdgeManagment Type | 1 . . . 1 | Indicates if the management of the edge resource session is client-driven or application provider-driven. |
| activationTrigger | Activation TriggerType | 0 . . . 1 | Condition to activate edge resources for this ProvisioningSession. |
| Profile | EASProfile | 1 . . . 1 | The EAS profile used by the 5GMS AF or by the EEC to discover and select one or more EAS instances to serve media streaming sessions. The format of the EASProfile is defined in table 8.1.5.2.3-1 of TS 29.558. |
| applicationContextRelocation Requirements | ACR Requirements Type | 0 . . . 1 | Application Context Relocation tolerance and requirements. |

According to some embodiments, the 5GMSA M1 may be enabled to set events for an existing EAS such that when the EAS profile reaches certain conditions, one or more events are issued. Furthermore, the 5GMSA M1 interface may be provided the ability to subscribe and receive events from another EAS for activating a new EAS.

The EAS properties may be defined by the profile known as EASProfile in 29.558. The EAS profile may change during its operation. According to some embodiments, events may be defined based on KPI parameters. For example, if one or more parameters reach a certain value, the 5GMS AS/EAS may generate a corresponding event. The event may be collected using data collection AF.

In some embodiments, the service KPIs may be defined in accordance with the following table.

TABLE 2

| Attribute name | Data type | P | Cardinality | Description |
|---|---|---|---|---|
| maxReqRate | String | O | 0 . . . 1 | Maximum request rate from the Application Client supported by the EAS. |
| maxRespTime | Uinteger | O | 0 . . . 1 | The maximum response time, in the units of milliseconds, advertised for the AC's service requests. This includes the round trip time of the request and response packet, the processing time at the EAS and time required by EAS to consume any 3GPP core network capabilities. |
| Avail | String | O | 0 . . . 1 | Advertised percentage of time the server is available for the AC's use. |
| avlComp | String | O | 0 . . . 1 | The maximum compute resource available for the AC. |
| avlGraComp | String | O | 0 . . . 1 | The maximum graphical compute resource available for the AC. |
| avlMem | String | O | 0 . . . 1 | The maximum memory resource available for the AC. |
| avlStrg | String | O | 0 . . . 1 | The maximum storage resource available for the AC. |
| connBand | BitRate | O | 0 . . . 1 | The connection bandwidth in Kbit/s advertised for the AC's use. |

According to some embodiments, the Application Provider may set an event trigger condition when the application service provider provisions a new EAS. The event trigger condition may be carried in the activation trigger parameter.

According to some embodiments, events may be set by adding a parameter to the EdgeResourcesConfiguration. For example, the Application Service provider may set an event trigger condition when it provisions a new EAS. The event trigger condition may be carried in the activation trigger parameter, as specified in the following table in which the underlined parameter is a new parameter.

TABLE 3

| Property name | Type | Cardinality | Description |
|---|---|---|---|
| edgeResourcesConfigurationId | ResourceId | 1 . . . 1 | An identifier for this Metrics Reporting Configuration that is unique within the scope of the enclosing Provisioning Session. |
| edgeManagementMode | EdgeManagmentType | 1 . . . 1 | Indicates if the management of the edge resource session is client-driven or application provider-driven. |
| activationTrigger | ActivationTrigger Type | 0 . . . 1 | Condition to activate edge resources for this ProvisioningSession. |
| TriggeringEvents | TriggerEvents | 0 . . . 1 | Condition for triggering events in this provision Session. |
| Profile | EASProfile | 1 . . . 1 | The EAS profile used by the 5GMS AF or by the EEC to discover and select one or more EAS instances to serve media streaming sessions. |

TABLE 3-continued

| Property name | Type | Cardinality | Description |
|---|---|---|---|
| | | | The format of the EASProfile is defined in table 8.1.5.2.3-1 of TS 29.558. |
| applicationContextRelocation Requirements | ACRRequirements Type | 0 . . . 1 | Application Context Relocation tolerance and requirements. |

In some embodiments, the events may be set using the event provisioning API (R1).

According to some embodiments, the Application Provider may set up the conditions for starting a new edge server by the 5G device. For example, the Application Provider may set the conditions for generating events in a running edge server E1 during creation or updating the provisioning of the edge server through the M1 interface. The Application Provider may further set the condition of activating a new edge server E2 during the creation or updating the provisioning of the edge server through the M1 interface.

In some embodiments, the 5G device's MSH may subscribe to the events defined by E1 during the provisioning of E1. When any of the conditions in E1 reaches the set limits defined by the Application Provider, the 5GMS AS/EAS may issue an event. Since the MSH is subscribed to the E1 events, the MSH may receive the issued event. After receiving the issued event, the MSH may check whether the received event meets any of activation condition for E2 (e.g., new edge server). For example if the running edge server E1 is too congested, the new edge server E2 may be activated.

Figure 4:
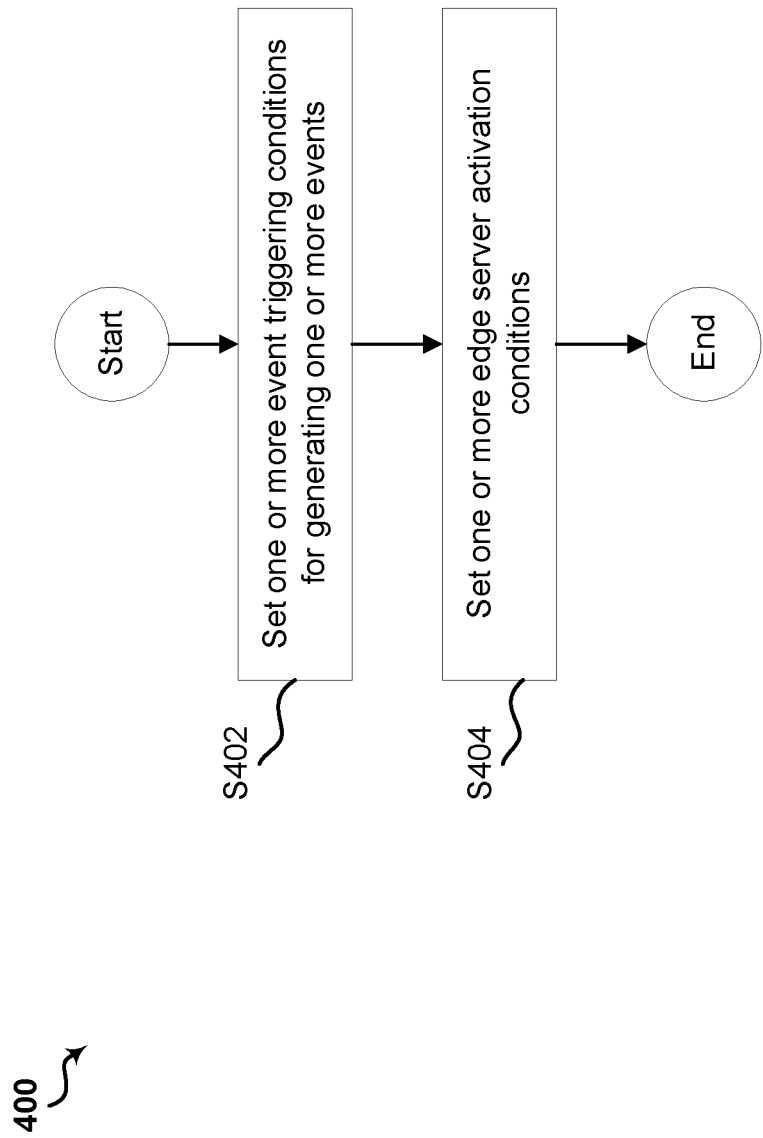
FIG. 4 is a flowchart of an example process for setting one or more conditions in a running edge server, according to embodiments.

FIG. 4 illustrates a flowchart of an example process 400 for setting conditions during provisioning of a running edge server. The process 400 may be performed by Application Provider 326 (FIG. 3). The process may start at operation S402 where one or more event triggering conditions for generating one or more event are set. The process proceeds to operation S404 where one or more edge server activation conditions are set. For example, the edge server activations conditions may specify the conditions for activating a new server when an event is issued.

Figure 5:
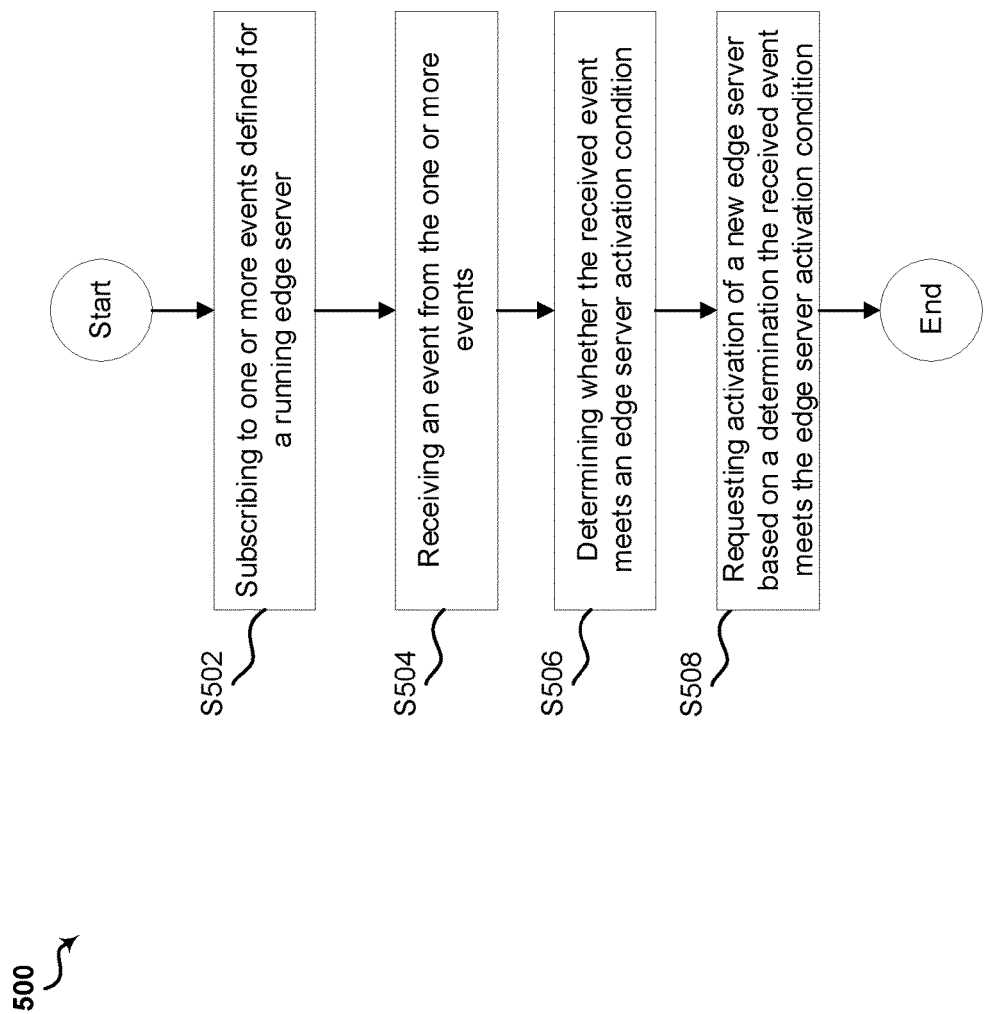
FIG. 5 is a flowchart of an example process for activation of a new edge server, according to embodiments.

FIG. 5 illustrates a flowchart of an example process 500 for activation of a new server. The process 500 may be performed by the UE 301 (FIG. 3). The process may start at operation S502 where subscription is performed for receiving one or more events defined for a running edge server. The subscription may be performed by the MSH 306. Each of the one or more events may be associated with one or more event triggering conditions defined for generating a respective event. The process proceeds to operation S504 where an event from the one or more events are received. The event may be issued from the running edge server based on a determination an event triggering condition from the one or more event triggering conditions has a value that reaches a set limit.

The process proceeds to operation S506 where it is determined whether the received event meets an edge server activation condition. The process proceeds to operation S508 where activation of a new edge server is requested based on a determination the received event meets the edge server activation condition. For example, the UE 301 may request the Application Provider 326 to activate a new edge server based on a determination that an event meets an edge server activation condition.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The above disclosure also encompasses the embodiments listed below:

(1) A method performed by at least one processor of a network node, the method including subscribing to one or more events defined for a first edge server, each subscribed event being associated with one or more triggering conditions; responsive to determining by the first edge server that at least one triggering condition is satisfied, generating a respective subscribed event; receiving an event notification corresponding to the generated event; determining whether the event associated with the received event notification meets an edge server activation condition; and activating a second edge server based on a determination that the event meets the edge server activation condition.

(2) The method according to feature (1), in which the one or more events are defined by an application services provider through an M1 interface during creation or provisioning of the first edge server.

(3) The method according to feature (1), in which the one or more event triggering conditions for each event are defined by an application services provider through an M1 interface during creation or provisioning of the second edge server.

(4) The method of feature (3), in which the one or more event triggering conditions are included in a parameter of an edge resources configuration resource.

(5) The method of any one of features (1)-(4), in which the edge server activation condition is defined by an application services provider through an M1 interface during creation or provisioning of the first edge server.

(6) The method of feature (5), in which the edge server activation condition is included in a parameter of an edge resources configuration resource.

(7) The method according to any one of features (1)-(6), in which the one or more event triggering conditions correspond to key performance indicators of the first edge server.

(8) The method according to feature (7), in which the key performance indicators correspond to one or more of an available memory of the first edge server, a processing capacity of the first edge server, a bandwidth of the first edge server, and a response time of the first edge server.

(9) A network node, including: at least one memory configured to store program code; and at least one processor configured to read the program code and operate as instructed by the program code, the program code including: subscribing code configured to cause the at least one processor to subscribe to one or more events defined for a first edge server, each subscribed event being associated with one or more triggering conditions, generating code configured to cause the at least one processor to, responsive to determining by the first edge server that at least one triggering condition is satisfied, generate a respective subscribed event; receiving code configured to cause the at least one processor to receive an event notification corresponding to the generated event; determining code configured to cause the at least one processor to determine whether the event associated with the received event notification meets an edge server activation condition, and activating code configured to cause the at least one processor to activate a second edge server based on a determination that the event meets the edge server activation condition.

(10) The network node according to feature (9), in which the one or more events are defined by an application services provider through an M1 interface during creation or provisioning of the first edge server.

(11) The network node according to feature (9), in which the one or more event triggering conditions for each event are defined by an application services provider through an M1 interface during creation or provisioning of the second edge server.

(12) The network node of feature (11), in which the one or more event triggering conditions are included in a parameter of an edge resources configuration resource.

(13) The network node of any one of features (9)-(12), in which the edge server activation condition is defined by an application services provider through an M1 interface during creation or provisioning of the first edge server.

(14) The network node of feature (13), in which the edge server activation condition is included in a parameter of an edge resources configuration resource.

(15) The network node according to any one of features (9)-(14), in which the one or more event triggering conditions correspond to key performance indicators of the first edge server.

(16) The network node according to feature (15), in which the key performance indicators correspond to one or more of an available memory of the first edge server, a processing capacity of the running edge server, a bandwidth of the first edge server, and a response time of the first edge server.

(17) The network node according to any one of features (9)-(16), in which the network node includes a media session handler that performs the subscribing to the one or more events

(18) A non-transitory computer readable medium having instructions stored therein, which when executed by a processor in a network node cause the processor to execute a method including: subscribing to one or more events defined for a first edge server, each subscribed event being associated with one or more triggering conditions; responsive to determining by the first edge server that at least one triggering condition is satisfied, generating a respective subscribed event; receiving an event notification corresponding to the generated event; determining whether the event associated with the received event notification meets an edge server activation condition; and activating a second edge server based on a determination that the event meets the edge server activation condition.

(19) The non-transitory computer readable medium according to feature (18), in which the one or more events are defined by an application services provider through an M1 interface during creation or provisioning of the first edge server.

(20) The non-transitory computer readable medium according to feature (18), in which the one or more events are defined by an application services provider through an M1 interface during creation or provisioning of the second edge server.

What is claimed is:

1. A method performed by at least one processor of a user equipment (UE), the method comprising:
    subscribing to one or more events defined for a first edge server through a media session handler of the UE communication with a 5G Media Streaming (5GMS) application function (AF) via an 5GMS scope M5 interface, each subscribed event being associated with one or more event triggering conditions, wherein responsive to determining by the first edge server that at least one event triggering condition is satisfied, a respective subscribed event is generated by a 5GMS application, wherein the at least one event triggering condition is specified in an activation trigger parameter included in an EdgeResourcesConfiguration;
    receiving, by the media session handler of the UE, an event notification corresponding to the generated event;
    determining, by the media session handler of the UE, whether the event associated with the received event notification meets an edge server activation condition; and
    activating, via a request transmitted from a 5GMS-Aware Application of the UE to a 5GMS Application Provider through a 5GMS M8 interface, a second edge server based on a determination that the event meets the edge server activation condition, wherein the activating the second edge server includes provisioning a new edge server, wherein the one or more event triggering conditions for each event are defined by a 5GMS application services provider communicating with the 5GMS AF in an edge data network through an 5GMS scope M1 interface during creation or provisioning of the second edge server in the edge data network, wherein the second edge server is created or provisioned through an M3 or EDGE-3 interface, wherein the edge server activation condition is defined by the 5GMS application services provider through the 5GMS scope M1 interface during creation or provisioning of the first edge server, and wherein the edge server activation condition is included in a parameter of an edge resources configuration resource.

2. The method according to claim 1, wherein the one or more events are defined by the 5GMS application services provider through the 5GMS scope M1 interface during creation or provisioning of the first edge server.

3. The method according to claim 1, wherein the one or more event triggering conditions correspond to key performance indicators of the first edge server.

4. The method according to claim 3, wherein the key performance indicators correspond to one or more of an available memory of the first edge server, a processing capacity of the first edge server, a bandwidth of the first edge server, and a response time of the first edge server.

5. A user equipment (UE), comprising:
at least one memory configured to store program code; and
at least one processor configured to read the program code and operate as instructed by the program code, the program code comprising:
subscribing code configured to cause the at least one processor to subscribe to one or more events defined for a first edge server through a media session handler of the UE communication with a 5G Media Streaming (5GMS) application function (AF) via an 5GMS scope M5 interface, each subscribed event being associated with one or more event triggering conditions, wherein responsive to determining by the first edge server that at least one event triggering condition is satisfied, a respective subscribed event is triggered, wherein the at least one event triggering condition is specified in an activation trigger parameter included in an EdgeResourcesConfiguration;
receiving code configured to cause the at least one processor to receive, by the media session handler of the UE, an event notification corresponding to the generated event;
determining code configured to cause the at least one processor to determine, by the media session handler of the UE, whether the event associated with the received event notification meets an edge server activation condition; and
activating code configured to cause the at least one processor to activate, via a request transmitted from a 5GMS-Aware Application of the UE to a 5GMS Application Provider through a 5GMS M8 interface, a second edge server based on a determination that the event meets the edge server activation condition,
wherein the activation of the second edge server includes provisioning a new edge server,
wherein the one or more event triggering conditions for each event are defined by a 5GMS application services provider communicating with a 5GMS application function (AF) the 5GMS AF in an edge data network through an 5GMS scope M1 interface during creation or provisioning of the second edge server in the edge data network, wherein the second edge server is created or provisioned through an M3 or EDGE-3 interface, wherein the edge server activation condition is defined by the 5GMS application services provider through the 5GMS scope M1 interface during creation or provisioning of the first edge server, and wherein the edge server activation condition is included in a parameter of an edge resources configuration resource.

6. The UE according to claim 5, wherein the one or more events are defined by the 5GMS application services provider through the 5GMS scope M1 interface during creation or provisioning of the first edge server.

7. The UE of claim 5, wherein the one or more event triggering conditions are included in a parameter of an edge resources configuration resource.

8. The UE according to claim 5, wherein the one or more event triggering conditions correspond to key performance indicators of the first edge server.

9. The UE according to claim 8, wherein the key performance indicators correspond to one or more of an available memory of the first edge server, a processing capacity of the first edge server, a bandwidth of the first edge server, and a response time of the first edge server.

10. The UE according to claim 5, wherein the network node includes a media session handler that performs the subscribing to the one or more events.

11. A non-transitory computer readable medium having instructions stored therein, which when executed by a processor in a user equipment (UE) cause the processor to execute a method comprising:
subscribing to one or more events defined for a first edge server through a media session handler of the UE communication with a 5GMS application function (AF) via an 5GMS scope M5 interface, each subscribed event being associated with one or more event triggering conditions, wherein responsive to determining by the first edge server that at least one event triggering condition is satisfied, a respective subscribed event is generated by a 5GMS application, wherein the at least one event triggering condition is specified in an activation trigger parameter included in an EdgeRsourcesConfiguration;
receiving, by the media session handler of the UE, an event notification corresponding to the generated event;
determining, by the media session handler of the UE, whether the event associated with the received event notification meets an edge server activation condition; and
activating, via a request transmitted from a 5GMS-Aware Application of the UE to a 5GMS Application Provider through a 5GMS M8 interface, a second edge server based on a determination that the event meets the edge server activation condition,
wherein the activating the second edge server includes provisioning a new edge server,
wherein the one or more event triggering conditions for each event are defined by a 5G Media Streaming (5GMS) application services provider communicating with a 5GMS application function (AF) in an edge data network through an 5GMS scope M1 interface during creation or provisioning of the second edge server in the edge data network, wherein the second edge server is created or provisioned through an M3 or EDGE-3 interface, wherein the edge server activation condition is defined by the 5GMS application services provider through the 5GMS scope M1 interface during creation or provisioning of the first edge server, and wherein the edge server activation condition is included in a parameter of an edge resources configuration resource.

12. The non-transitory computer readable medium according to claim 11, wherein the one or more events are defined by the 5GMS application services provider through the 5GMS scope M1 interface during creation or provisioning of the second edge server.

* * * * *